United States Patent [19]

Dulck et al.

[11] Patent Number: 4,943,808
[45] Date of Patent: Jul. 24, 1990

[54] COMMUNICATIONS SYSTEM WITH MOVING BODIES WITH THE AID OF SATELLITES

[75] Inventors: Jean-Francois Dulck, Ramonville St Agne; Denis Rouffet, Boulogne, both of France

[73] Assignee: Centre National D'Etudes Spatiales, Paris, France

[21] Appl. No.: 309,888

[22] Filed: Feb. 14, 1989

[30] Foreign Application Priority Data

Mar. 2, 1988 [FR] France ............................ 88 02632

[51] Int. Cl.⁵ .................... H04B 7/19; H04B 7/185
[52] U.S. Cl. .................................. 342/356; 455/12
[58] Field of Search .............. 342/352, 354, 356, 357; 455/12, 25; 364/459

[56] References Cited

U.S. PATENT DOCUMENTS

| | | | |
|---|---|---|---|
| 4,502,051 | 2/1985 | Dondl | 342/356 |
| 4,652,884 | 3/1987 | Starker | 342/357 |

FOREIGN PATENT DOCUMENTS 0059454  2/1982  European Pat. Off. .
0213355  7/1986  European Pat. Off. .

OTHER PUBLICATIONS

Proceedings of the 7th International Conference on Digital Satellite Communications, Munich, 12–16, Mai, 1986, pp. 641–652, VDE-Verlag, GmbH, Berlin, DE, P. Dondl: "Digital Transmission in a Quasi-Geostationary Sat. System".

Proceedings of the IEEE, vol. 72, No. 11, Nov. 1984, pp. 1627–1636, IEEE, New York, US; K. Brayer, "Packet Switching for Mobile Earth Stations via Low-Orbit Satelite Network".

*Primary Examiner*—Gregory C. Issing
*Attorney, Agent, or Firm*—Nixon & Vanderhye

[57] ABSTRACT

The system comprises at least two geosynchronous satellites (S-A, S-B) having the same elliptical orbit and the same trace on the ground. The longitudes of ascending node are displaced. The moving bodies have a vertically pointed fixed antenna. The system operates for 24 hours continuously with one or other of the satellites.

6 Claims, 4 Drawing Sheets

COMMUNICATIONS SYSTEM WITH MOVING BODIES WITH THE AID OF SATELLITES

BACKGROUND OF THE INVENTION

1. Field of the Invention

The present invention relates to a communications system with moving bodies relayed by satellites. The Applicant has designated this system by the acronym "SYCOMORES" abbreviation for communications system with moving bodies relayed by satellites.

2. Description of Prior Art

The term moving body is understood to mean cars, lorries, ships, aircraft, trains and, by extension, any user equipped with portable terminals which are temporarily stationary.

In the early years of the space era communication satellites appeared with a period equal to 12 hours and with highly elliptical orbits (perigee approximately 1,000 km and apogee 39,000 km). These systems were mainly developed by the USSR with MOLNYA-type satellites.

However, this suffers from the following disadvantages: by no means negligible atmospheric deceleration due to the limited perigee height, significant interference from the earth's potential, inversely proportional to the value of the semi-major axis of the orbit, double passage through the Van Allen regions, needs to use at least three satellites for a 24 hour coverage, elongated lenticular shape of the coverage zone in accordance with an east-west axis, not very suitable for Western Europe, significant variation in the satellite-earth distance leading to a high Doppler effect and a "zoom" effect causing radio coverage and attitude control problems.

The event of geostationary satellites made it possible to solve certain of these problems. Such satellites, with their equatorial circular orbit and period of 24 hours, seem to be immobilized above the earth, so that they can constitute privileged relays for telecommunications networks.

However, this solution still suffers from disadvantages. Thus, the elevation angle of a geostationary satellite, seen from a moving body on the ground, varies with the latitude of the moving body, which implies a pointing of the antennas towards the satellite. The following table gives values for the elevation as a function of the latitude of a place, for a certain number of towns in the northern hemisphere in an area between the Maghreb and Scandinavia.

|  | LATITUDE | MAX. ELEVATION |
| --- | --- | --- |
| KIRUNA | 68° | 16° 2 |
| STOCKHOLM | 59° 3 | 23° |
| COPENHAGEN | 55° 5 | 26° 5 |
| AMSTERDAM | 52° 3 | 30° |
| PARIS | 49° 1 | 33° 8 |
| TURIN | 45° 2 | 38° 5 |
| MADRID | 40° 6 | 44° 6 |
| ALGIERS | 36° 6 | 47° 3 |

Although this elevation varies, it is relatively small for high latitudes, which causes transmission problems. Thus, for an elevation angle of e.g. 38°, a 8 m high obstacle 10 m from a moving body would prevent communication.

However, such obstacles are frequently encountered in cities and suburbs.

Moreover, the azimuth of the moving body-satellite direction changes continuously with respect to the moving body, when the latter changes its direction of movement. It is therefore necessary to provide means for permanently pointing the antenna of the moving body towards the satellite. Finally, with regards to the retransmission means on board the satellite, their power being proportional to 1/sin E (in which E is the elevation), it varies with the latitude of the working area, or at least it is fixed to a high value dictated by the lowest elevation.

In order to obviate these disadvantages, constellations of satellites have been proposed with coordinated orbits such that a permanent coverage is ensured on the ground. For example, in the GPS/NAVSTAR system, there are 21 satellites with circular orbits of period 12 hours, four such satellites always being in direct view from a point on the earth. European patent application 213 355 describes a constellation of this type, but with only four satellites having elliptical orbits. These satellites have the same period and different traces on the ground. Two satellites have their perigee in the northern hemisphere and the two others in the southern hemisphere. Therefore any point on earth can "see" one of these satellites at all times. However, such a system still suffers from disadvantages, in the sense that the elevation of the satellite seen from the moving body varies considerably between individual regions of the earth.

Other constellations are described in the article by J. E. DRAIM entitled "Three- or four-satellite continuous-coverage constellations" published in "Journal of Guidance, Control and Dynamics", vol. 8, No. 6, November/December 1985, pp 725–730.

Although of interest in certain respects, none of these constellations makes it possible to solve all the problems inherent in communications with moving bodies, which are essentially as follows: first it is highly desirable to get round the need from having to orient the vehicle antenna towards the satellite; it is preferable to be able to use high gain antennas (e.g. above 10 dB) in order to increase the transmission capacity; finally, the system must be well protected against interference from the environment.

SUMMARY OF THE INVENTION

The present invention therefore relates to a system obviating the disadvantages of the prior art and which meets all these requirements.

To this end, the invention provides a system, which comprises: at least one central station on the ground at a place close to the centre of a coverage area with a substantially triangular geographical shape, said station being connected to a communications network and having an antenna orientable in the vicinity of the vertical, at least two geosynchronous satellites having elliptical orbits with identical characteristics and the same trace on the ground, but having longitudes of ascending node displaced by $2\pi/n$ if n is the number of satellites, each said satellites having transmission-reception means connected to antennas and means for pointing these antennas towards the central station on the ground for the complete time during which the satellite passes over the ground coverage area, moving bodies equipped with a vertically pointed high gain antenna.

Compared with the MOLNYA-type 12 hour, elliptical orbit constellations, the present invention leads to an absence of atmospheric deceleration, no passage through Van Allen zones, reduction of the interference due to the earth's potential, two satellites (and not three) are adequate for a 24 hour coverage (even though three satellites make it possible to obtain a certain redundancy), adaptation of the shape of the coverage zone (spherical triangle) to Europe, absence of eclipses in northern or southern latitudes above 35° and a limited variation in the distance between the satellite and earth leading to a reduced Doppler effect and to a configuration of the satellite very close to that of a geostationary satellite.

The system according to the invention can operate with only two satellites, whose longitudes of ascending nodes are displaced by 180°. This is the constellation with the minimum number of satellites for 24 hour coverage. However, a constellation with three satellites, whereof the longitudes of ascending nodes are displaced by 120° with respect to one another, allows a 24 hour coverage, even in the case of a breakdown of any one of the three satellites of the constellation. In this way it is possible to ensure the perenniality of the service for a given life of the system.

BRIEF DESCRIPTION OF THE DRAWINGS

The invention is described in greater detail hereinafter relative to non-limitative embodiments and the attached drawings, wherein show.

DETAILED DESCRIPTION OF PREFERRED EMBODIMENTS

In the following description, it will be assumed that the area covered by the system is located in the northern hemisphere between approximately latitudes 35° and 60° and approximately between longitudes −10° and +20°. Such an area essentially covers North Africa, Western Europe and the south of the Scandinavian peninsula. It is obvious that the invention is not limited to such an area, but can easily be adapted to any other area of the world located in either of the two hemispheres.

Figure 1:
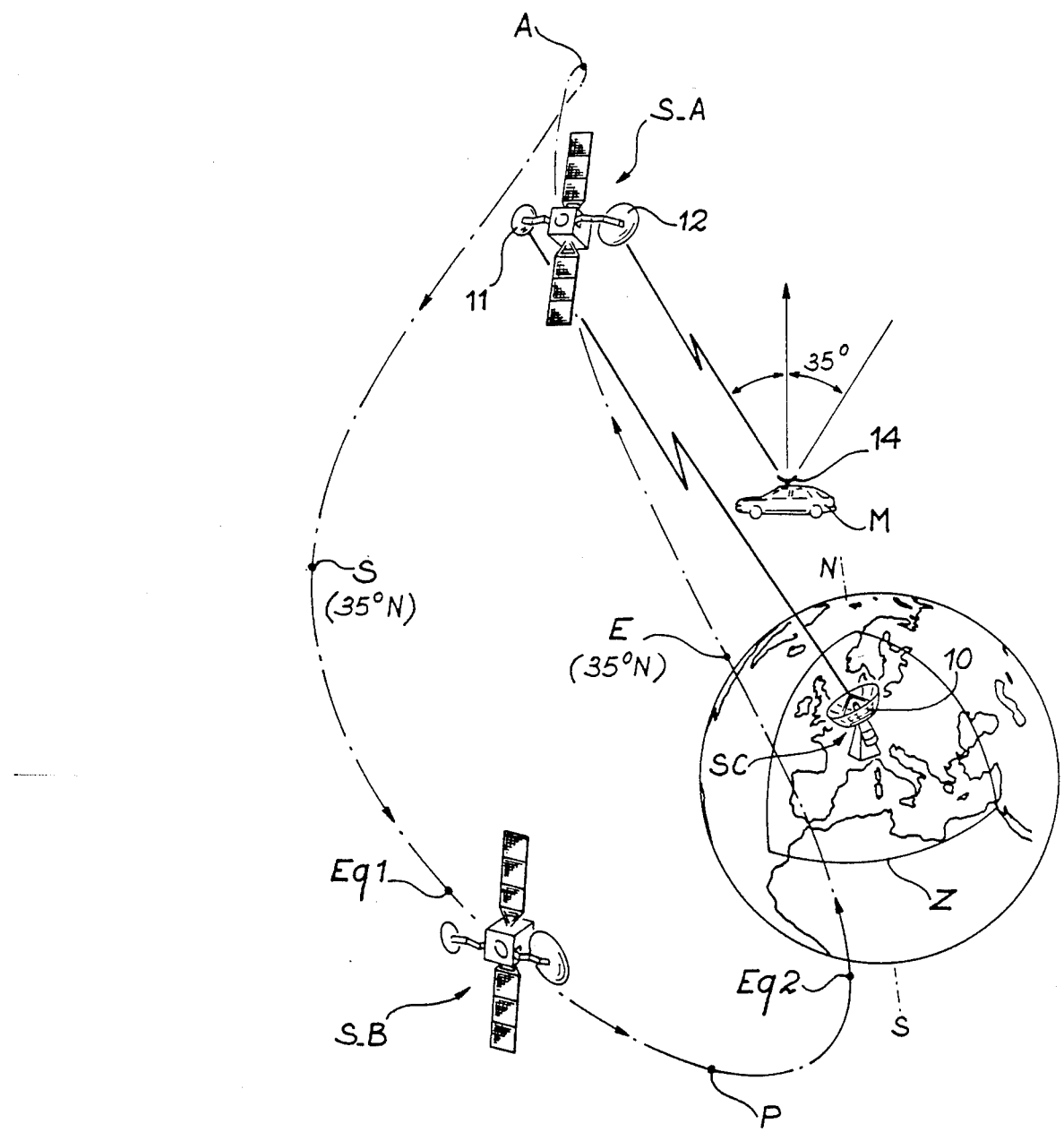
FIG. 1 Diagrammatically the system according to the invention.

FIG. 1 shows a coverage area Z in the form of a spherical triangle, a central station SC located on the ground at a point close to the centre of the area and two geosynchronous satellites S-A and S-B having elliptical orbits with identical parameters. In an exemplified manner, these parameters can be apogee A at approximately 50 543.4 km, perigee P at approximately 21 028.6 km, semi-major axis 42 164 km, inclination of 63°4, argument of the perigee 270 and eccentricity of the orbit 0.35.

On the orbit of FIG. 1 are marked the points Eq1 and Eq2 located in the plane of the equator, as well as points E and S at latitude 35° and respectively corresponding to the entry into and the exit from the operational zone of the satellites.

Each satellite has one or two antennas 11 and 12, each of which is pointed towards the central station SC throughout the period when the satellite is passing over the coverage area. The central station can comprise a connection station and a control station.

FIG. 1 also shows a moving body M (which is obviously located in the area Z, but which is shown above the same for reasons of clarity). Each moving body is equipped with an antenna 14, whose axis points permanently towards the zenith (it is consequently not orientable). As will be shown hereinafter, the maximum angle between said vertical axis and the moving body-satellite line is 35°.

Three phases can be distinguished for describing the operation of this system:

first phase: beyond latitude 35° north, the satellite retransmitter is in service, communications to the moving bodies are relayed by the satellite, via the ground connection station and for a given satellite this phase lasts 12 hours;

second phase: between 35° and the equator there is an ascending part (from south to north) and a descending part (from north to south), whereby during the former the control station verifies the state of the satellite and controls its putting into operation just prior to latitude 35°, whereas during the latter the control station controls the putting out of operation of the transmitters on board the satellite and checks the state of the satellite before it becomes invisible for the station and this second phase lasts 6 hours;

third phase: the satellite is beneath the plane of the equator, so that it is left to its own devices, naturally unless a supplementary control station is located somewhere in the southern hemisphere and this last phase lasts 6 hours.

Figure 2:
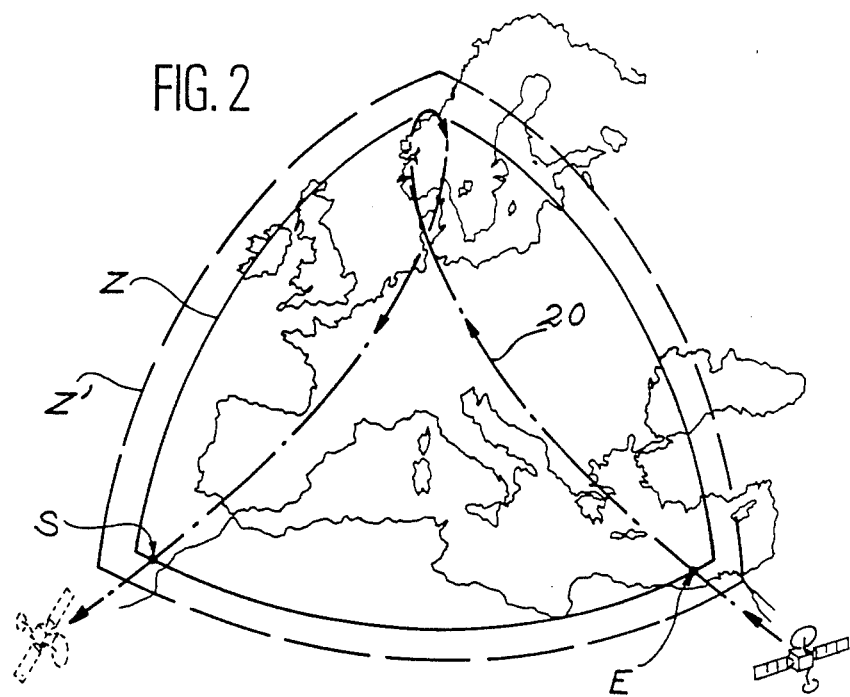
FIG. 2 The geographical coverage obtained and the ground trace of the satellites.

FIG. 2 shows the ground trace of the satellites. It should be stressed that this trace is the same for two or three satellites. This trace 20 enters area Z at point E, loops towards latitude 60° north and passes out of the area at point S. Points E and S are at a latitude of approximately 35°.

Within the triangular geographical area Z, whatever the location where the moving body is located, it is possible to see from said location at least one satellite during 12 consecutive hours. Moreover, in area Z, the elevation of the satellite seen from a moving body is always between 55° and 90°. Therefore the satellite is always seen within a vertically axed cone, whose cone semi-angle is less than 35°.

FIG. 2 also shows an area Z' which is slightly more extensive than area Z. In said area, the satellite visibility angle is between 50° and 90°.

Figure 3:
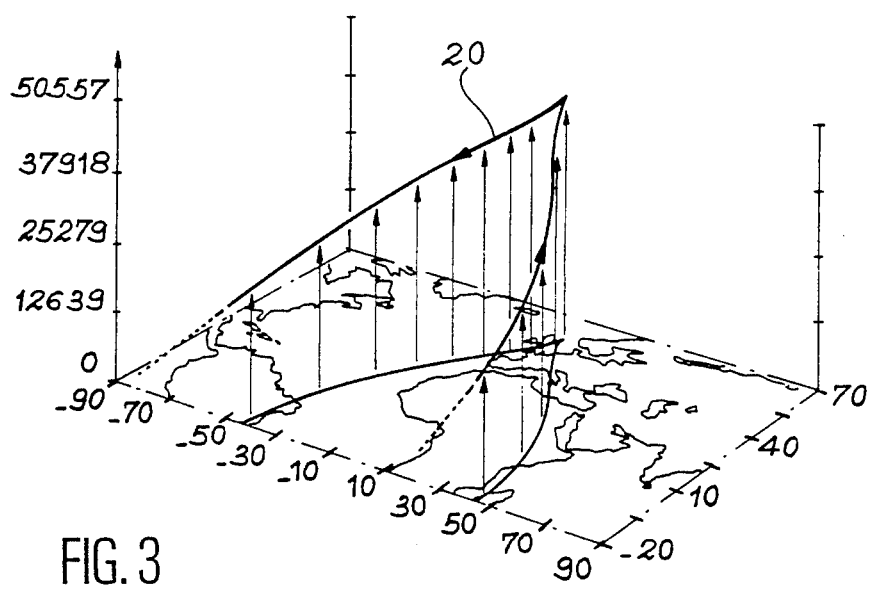
FIG. 3 In greater detail, the altitude of the satellites.

FIG. 3 shows the altitude of the satellite with respect to the ground. On the two axes of the horizontal plane are plotted the longitude and latitude and on the vertical axis the altitude. Only the part located above latitude 35° north is used. This graph makes it possible to evaluate the small altitude variation of the satellites with the advantages devolving therefrom and which were stressed hereinbefore (quasi-geostationary position).

Figure 4:
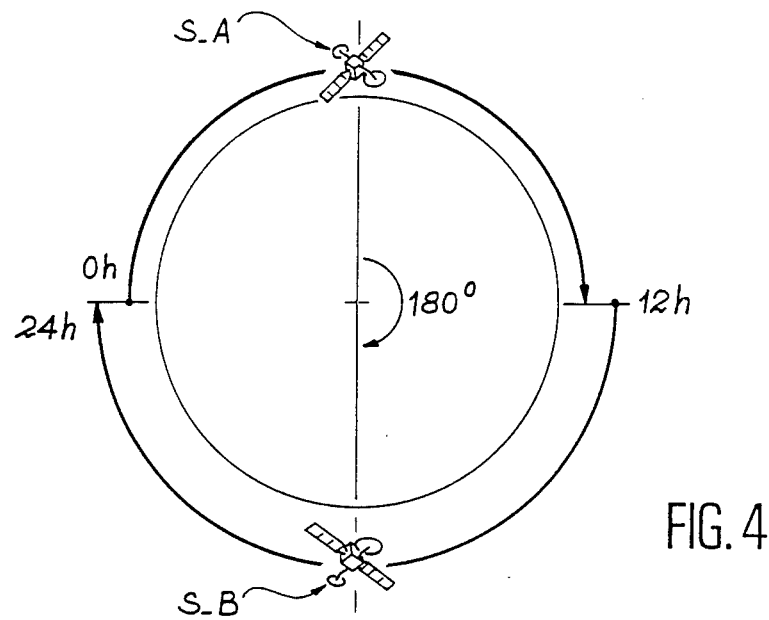
FIG. 4 The operation of a constellation with two satellites.
Figure 5:
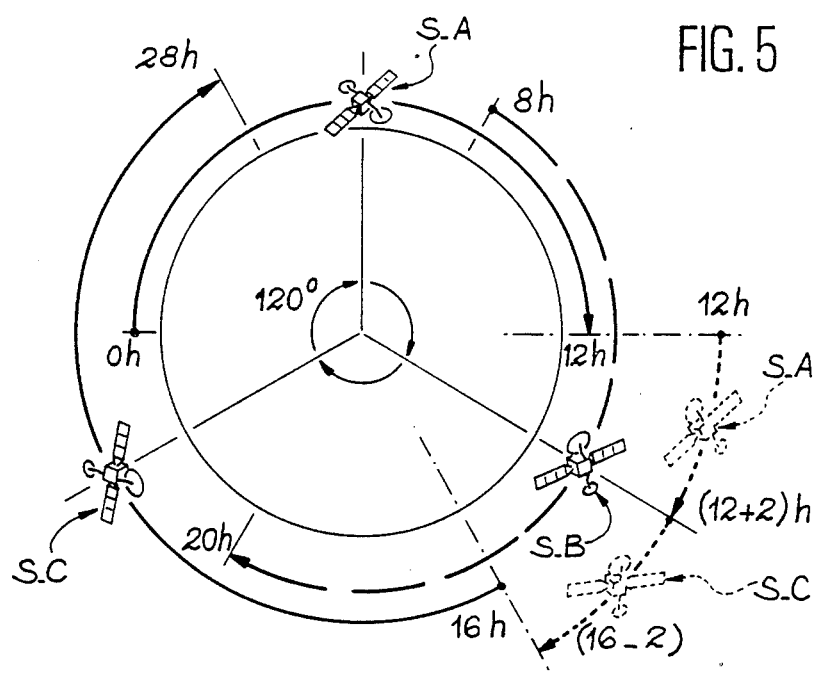
FIG. 5 The operation of a constellation with three satellites.

FIGS. 4 and 5 illustrate the use of the system in two types of constellation (with two or three satellites).

FIG. 4 shows the constellation with only two satellites S-A and S-B, which have longitudes of ascending node displaced by 180°. From hour zero, considered as the origin and marked 0h and which corresponds to the entry of satellite S-A above the coverage area, to 12 h, corresponding to the leaving of said zone, any point in the zone is visible from satellite S-A, so that communications are relayed by S-A. From 12 to 24 hours, satellite S-B is in direct visibility and communications are relayed by S-B. In this configuration, the latitude sweep of the orientable antenna integral with the satellite is ±15° and the longitude sweep ±2°.

In FIG. 5 the constellation has three satellites S-A, S-B and S-C, which have ascending node longitudes displaced by 120°.

In normal operation, there is a certain redundancy in the choice of the relay satellite. From 0 to 12 h, the relay can be satellite S-A, from 8 to 20 h satellite S-B and from 16 to 24 h satellite S-C. In this nominal configuration, the latitude sweep of the antennas is still ±15° and the longitude sweep ±2°.

If one of the three satellites develops a fault, it is still possible to obtain a 24 hour continuous service, by slightly modifying the latitude sweep, which passes to ±25°, whilst the longitude sweep passes to ±3°5. For example, in the case of a failure of satellite S-B, working will take place with satellite S-A from 0 to 12 h in the normal mode and then from 12 h to 12+2=14 h in the deteriorated mode (with higher longitude and latitude) and then from 16−2=14 h to 16 h with satellite S-C in the deteriorated mode and 16 to 24 h with satellite S-C in the normal mode. Thus, the duration of the deteriorated operating period does not exceed 4 out of 24 hours.

Figure 6:
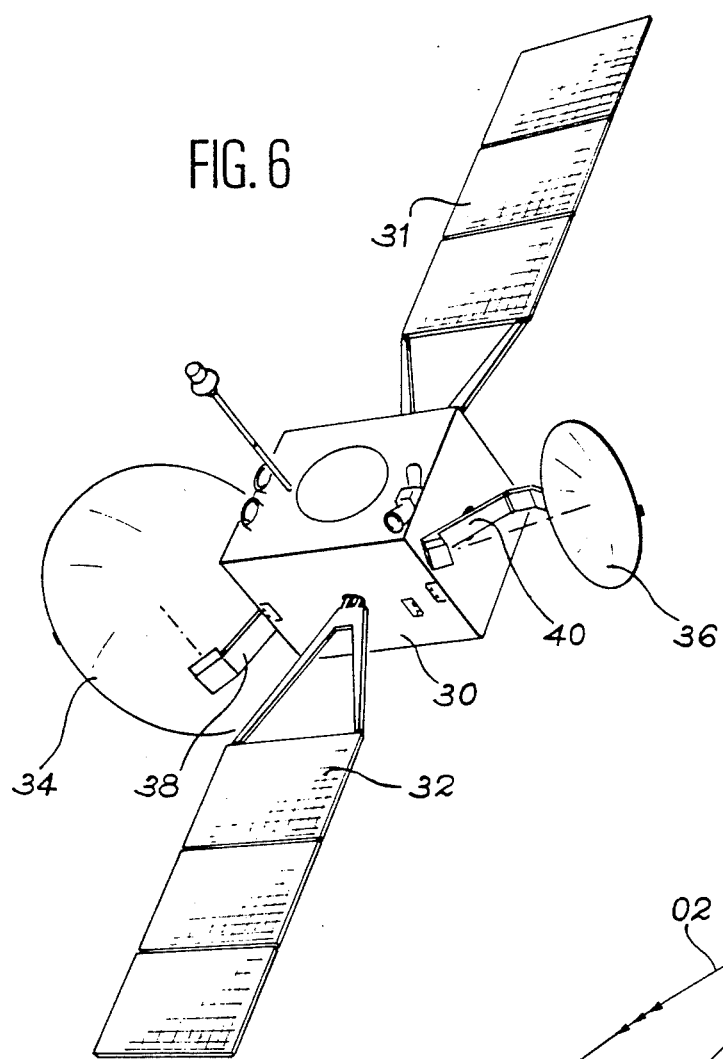
FIG. 6 An example of a satellite which can be used for realizing the invention.

FIG. 6 shows one of the satellite types which can be used for the realization of the system according to the invention. It is a MATRA EUROSTAR satellite. This satellite is stabilized in triaxial manner and is equipped with a kinetic wheel maintaining an axis in the north-south orientation. Stellar sensors are used for seeking and maintaining this orientation.

As shown, the satellite comprises a body 30, to which are fixed two solar panels 31, 32 and antennas, particularly two parabolic antennas 34, 36. By kinetic moment transfer between the kinetic wheel and the satellite body, it is possible to obtain a longitude sweep of a few degrees of the pointing direction of the antennas.

The latitude sweep is obtained as a result of a degree of freedom given to the antenna support (e.g. through an orientable arm, respectively 38–40). It is thus possible to obtain the requisite sweep of approximately ±15°. The combination of these two sweeps enables the antennas to be constantly pointed onto the control station located in the centre of the coverage area.

Other satellites can be used, e.g. the SPACEBUS 100 B satellite of AEROSPATIALE with an antenna orientation mechanism of the type "M.P.A. AEROSPATIALE".

Figure 7:
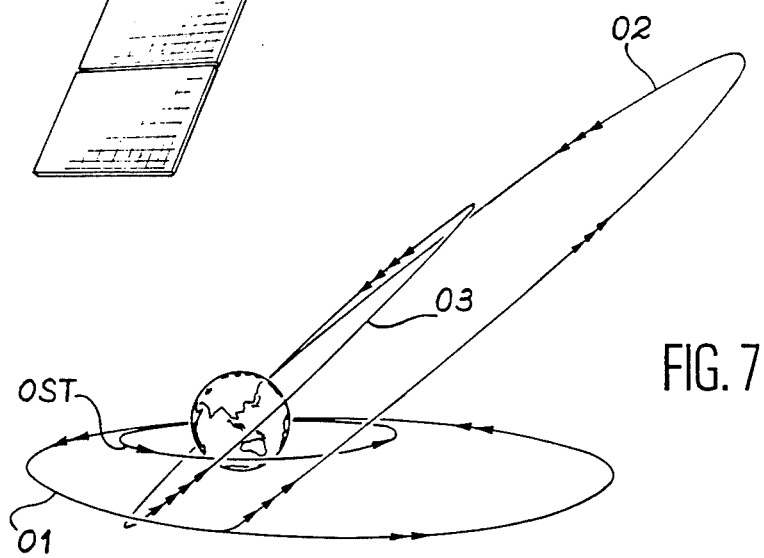
FIG. 7 A diagram for the launching and putting into orbit of satellites.

Numerous strategies are possible with regards to the putting into orbit of the satellites. Only one of these will be described in an explanatory manner in conjunction with FIG. 7. It makes use of the ARIANE IV rocket and requires three boosts. During launching, the satellite is accompanied by an ordinary geostationary satellite. The two satellites are placed on the standard transfer orbit of the ARIANE IV rocket, namely an orbit located in an quasi-equatorial plane (inclination of 7°), with a perigee of 200 km, an apogee of 35 975 km and a perigee argument of 178° (orbit marked OST in FIG. 7).

In the vicinity of the perigee of this standard transfer orbit, one satellite rocket is ignited for a first boost able to raise the apogee to 98 800 km, the orbit remaining in the same plane (orbit 01). This boost can be broken down into two or three boosts.

In the vicinity of the apogee of orbit 01, a new boost is given to change the plane of the orbit. The inclination of the latter is close to that of the final orbit (namely 63°4). This constitutes the greatest thrust and this can be broken down into two or three individual thrusts, the orbit becoming 02.

Finally, at an appropriate point of this orbit, a third thrust is imparted to the satellite to give it its final orbit.

With regards to the communications means between the ground station, the satellites and the moving bodies, it is possible to use any means known in the field of space telecommunications.

However, in an explanatory manner, it is pointed out that: the link between the connection station and the satellite can take place in band C between 6425 and 6525 MHz in the ground-satellite direction and between 3600 and 3700 MHz in the satellite-ground direction, the link between the control station and the satellite can take place in band S between 2029 and 2033.6 MHz in the ground-satellite direction and between 2203.5 and 2208 MHz in the satellite-ground direction, the link between the satellite and the various moving bodies (or possibly fixed stations) can take place in band L between 1646.5 and 1660.5 MHz in the ground-satellite direction and between 1545 and 1559 MHz in the satellite-ground direction.

The ground control station can operate with a 1000 W transmitter in band S and with a diameter 6 m, gain 41 dB antenna. The connection station can operate with a 10 W transmitter in band C and with a 2.5 m diameter, 42 dB gain antenna.

On board each satellite, there are three retransmitters, respectively 5 W in band S, 400 W in band L and 10 W in band C. The band C antenna will have a gain of 30 dB and a diameter of 2.5 m and the band C antenna a gain of 32 dB and a diameter of 0.75 m.

Naturally, these values are only given in an exemplified manner and in no way limit the scope of the invention.

We claim:

1. A voice communications system for providing continuous communication between a ground communications network and a plurality of moving bodies in a coverage area, said system comprises:
    at least one central station located on the ground at a place close to the centre of said coverage area said coverage area having a substantially triangular geographical shape, said station being connected to said ground communications network, said station having an antenna;
    at least n geosynchronous satellites, where n is an integer greater than one, said satellites having elliptical orbits with similar ground tracks over said coverage area, said satellites having longitudes of ascending nodes displaced by $2\pi/n$ degrees, each said satellite including transmission-reception means, responsive to start up and shut down commands from said central station, connected to at least one antenna for communication with the central station on the ground for the complete time during which the satellite passes over said ground coverage area; and each of said moving bodies including a receiver means including a high gain antenna.

2. System according to claim 1, comprising two satellites, whose orbits have longitudes of ascending node displaced by 180°.

3. System according to claim 1, wherein each satellite is of the triaxially stabilized type, having one axis oriented north-south and having a kinetic wheel and, said satellite including means for pointing the antennas operated by kinetic moment transfer, in order to give the antennas a longitude sweep and means permitting articulation in order to give the antennas a latitude sweep.

4. System according to claim 1, wherein said coverage area on the ground has means for remotely controlling the starting up of the transmission-reception means of the satellite when one of said satellite enters the coverage area and to shut down said satellite when the satellite leaves the coverage area.

5. A communications system with a plurality of moving bodies using satellites, comprising:
at least one central station located on the ground at a place close to the center of a coverage area, said coverage area comprising a substantially triangular geographical shape, said station being connected to a communications network and having an antenna having a substantially vertical orientation;
two geosynchronous satellites having elliptical orbits with identical characteristics and similar ground tracks, but having longitudes of ascending nodes displaced by 180°, each of said satellites including transmission-reception means including antennas and means for pointing said antennas towards said central station on the ground when said satellite passes over said ground coverage area;
a vertically pointed high gain antenna, provided to each of said moving bodies within said coverage area, for establishing a link between said moving body and said communications network through said transmission-reception means of said satellites; and
said central station including means for remotely starting up said transmission-reception means of one said satellite when said one of said satellites enters the coverage area and for remotely shutting down said transmission-reception means when said one of said satellites leaves said coverage area.

6. A communications system with a plurality of moving bodies using satellites, comprising:
at least one central station located on the ground at a place close to the center of a coverage area, said coverage area comprising a substantially triangular geographical shape, said station being connected to a communications network and having an antenna having a substantially vertical orientation;
three geosynchronous satellites having elliptical orbits with identical characteristics and similar ground tracks, but having longitudes of ascending nodes displaced by 120°, each of said satellites including transmission-reception means including antennas and means for pointing said antennas towards said central station on the ground when said satellite passes over said ground coverage area;
a vertically pointed high gain antenna, provided to each of said moving bodies within said coverage area, for establishing a link between said moving body and said communications network through said transmission-reception means of said satellites; and
said central station including means for remotely starting up said transmission-reception means of one said satellites when said one of said satellites enters the coverage area and for remotely shutting down said transmission-reception means when said one of said satellites leaves said coverage area.

* * * * *